United States Patent
Brister et al.

(10) Patent No.: US 9,463,379 B1
(45) Date of Patent: Oct. 11, 2016

(54) RIDE VEHICLE MOUNTED INTERACTIVE GAME SYSTEM

(71) Applicant: Thinkwell Group, Burbank, CA (US)

(72) Inventors: Michael Keith Brister, Los Angeles, CA (US); Thadeus C. Reed, Los Angeles, CA (US)

( * ) Notice: Subject to any disclaimer, the term of this patent is extended or adjusted under 35 U.S.C. 154(b) by 0 days.

(21) Appl. No.: 14/109,078

(22) Filed: Dec. 17, 2013

(51) Int. Cl.
*A63F 9/24* (2006.01)
*A63F 13/20* (2014.01)

(52) U.S. Cl.
CPC .................................... *A63F 13/06* (2013.01)

(58) Field of Classification Search
USPC ...................................................... 463/25–42
See application file for complete search history.

(56) References Cited

U.S. PATENT DOCUMENTS

| | | | |
|---|---|---|---|
| 6,796,908 B2 | 9/2004 | Weston | |
| 7,996,793 B2 | 8/2011 | Latta et al. | |
| 2007/0054745 A1* | 3/2007 | Henry et al. | 472/13 |
| 2009/0234666 A1 | 9/2009 | Crawford et al. | |
| 2012/0105637 A1* | 5/2012 | Yousefi et al. | 348/148 |
| 2012/0320080 A1* | 12/2012 | Giese et al. | 345/619 |
| 2013/0059670 A1* | 3/2013 | Crawford et al. | 472/36 |
| 2013/0094780 A1* | 4/2013 | Tang et al. | 382/284 |
| 2013/0169527 A1 | 7/2013 | Pryor | |
| 2013/0255530 A1* | 10/2013 | Willcox | 104/75 |
| 2014/0237415 A1* | 8/2014 | Amerige | 715/781 |
| 2014/0270483 A1* | 9/2014 | Lucey et al. | 382/154 |
| 2014/0309035 A1* | 10/2014 | Crawford et al. | 463/36 |

OTHER PUBLICATIONS

Space Fantasy, Universal stupdio japan ride! release date Mar. 2010.*
MIB ride at universal studio orlando. Release date Mar. 2000.*

* cited by examiner

*Primary Examiner* — Masud Ahmed
(74) *Attorney, Agent, or Firm* — Patrick Bright

(57) ABSTRACT

A unique combination of amusement park attraction ride vehicles with gesture-based game controllers to create a new form of interactive amusement ride, where on-board game displays, cameras and gesture recognition software for each of a plurality of riders, capture rider gestures and convert those gestures into signals that are inputs to, and affect, the interactive experience or game elements of the attraction.

4 Claims, 2 Drawing Sheets

RIDE VEHICLE MOUNTED INTERACTIVE GAME SYSTEM

A unique combination of amusement park attraction ride vehicles with gesture-based game controllers to create a new form of interactive amusement ride, called, in one embodiment, a Gesture-based Interactive Dark Ride (GIDR or "Guider"). GIDR uses small on-board cameras and gesture recognition software inside the ride vehicles, in which riders use their hands and body movements to interact with off-board media and ride scenes. The resulting ride system is a unique, immersive, and intuitive experience where riders interact directly with the attraction in a way that works like the gesture-based technologies in home game consoles (X-Box Kinect) and museum interactives (GestureTek, Snibbe Interactive). Unlike existing interactive, game-based, or shooting gallery-style dark rides, GIDR need not use laser guns or other physical controllers and need not align with off-board sensors.

An attraction is defined here as an amusement or theme park ride that may include an automated ride system with multiple vehicles (dark ride, endless chain, boat ride, spinning ride, or roller coaster) and supporting scenery, lighting, animatronics, special effects, game elements, video, and audio to support the story of the ride.

A small camera and infrared (IR) emitter may be placed/embedded on a ride vehicle body, e.g., in front of each rider/player. The system's sensors, meaning the emitter and the camera, may be small and low-profile, facilitating their addition to existing ride vehicles. The new system's sensors are individually aimed at each rider, so a rider's play is never obstructed, whatever vehicle row they occupy. This gesture recognition system is on-board a ride vehicle, traveling with the rider. This means that while a rider is on such a vehicle, the system/game can be interactive, and need not wait for the vehicle to arrive at a prescribed location, or to align to media.

Each vehicle in an attraction will have an independent set of on-board sensors for each of its riders. On-board systems for each vehicle collect gesture data and transmit it to off-board scene-based systems. A scene may include a single room, that may be occupied by one vehicle at a time. The game or interactivity processing takes place entirely off-board in the scene systems. On-board sound effect triggers and any on-board displayed data, like scoring information, is transmitted back to the vehicle from such off-board systems.

As vehicles travel from scene to scene throughout a ride, an off-board master computer will direct communication between each on-board vehicle system and one of many off-board scene systems, creating the appropriate interactivity for that vehicle's presence in that scene. When a first vehicle (or sometimes group of vehicles) moves into a first scene, a master computer connects those vehicles to that scene only for the duration of that scene. Once completed, the vehicle or group moves to a second scene and is connected by the master computer only to that scene. At the same time, a new vehicle or group may have moved into the first scene and been connected. This same vehicle to scene connection process occurs simultaneously with all scenes and vehicles throughout the attraction, preferably on a continuous cycle.

This system is not ride manufacturer dependent or ride platform dependent. The system should work well with slow moving dark rides, endless chains, boat rides, spinning rides, and roller coasters.

Rider/player gestures may change/vary from one installation to another depending on the game or experience. They may also change during the course of a single ride. Example gestures and their uses include but are not limited to:

Throwing—As riders mimic a throwing action, GIDR may generate images of a virtual thrown object in off-board media with the desired trajectory/velocity for that hand movement.

Shooting—A rider may mimic a gun with their hand/fingers and fire using a thumb gesture.

Waving—A rider's motions may guide movement of objects in off-board media. Such motions could, for example, row/steer a virtual boat, keep a virtual balloon aloft, or guide an object to a target.

Grabbing/Collecting—With appropriate motions, a rider may guide an avatar to catch and retain objects in a virtual environment.

Swatting/Blocking—Using an appropriate hand movement/gesture, riders may defend themselves, or protect an avatar, from moving or stationary objects in off-board media.

Swaying/Dodging—Two or more riders may move/lean to dodge objects in off-board media. Moving ride vehicles may also move/tilt in response to rider movements.

Slingshot—Using a pinching motion, a rider can pull back the band on a virtual slingshot and release, sending a media-based projectile towards targets in the scene.

Driving—GIDR, including the ride system, may react/respond to rider movements. For example, a trackless ride vehicle may be guided, in part, by a rider turning an imaginary steering wheel.

Signals/Symbols—Puzzle-based games may be played using gestures that represent keys and ciphers.

Sign Language—Because of the hand tracking technology, the GIDR could respond to simple sign language hand movements, providing participation opportunities to hearing-impaired riders.

Cooperative Play—The system provides for cooperative play by riders working together. Game play may include different roles for two or more riders who must work together to accomplish a goal.

Self-Adjusting/Handicapping—The system may automatically detect the presence and position of riders, automatically handicap children, or others, based on a metric such as player height, and/or adjust for a vehicle with one or more empty seats.

BRIEF DESCRIPTION OF THE DRAWING

The drawing is a sequence diagram for an embodiment of the invention, but the claims are not limited to this embodiment.

DETAILED DESCRIPTION OF THE DRAWING

Figure 1A:
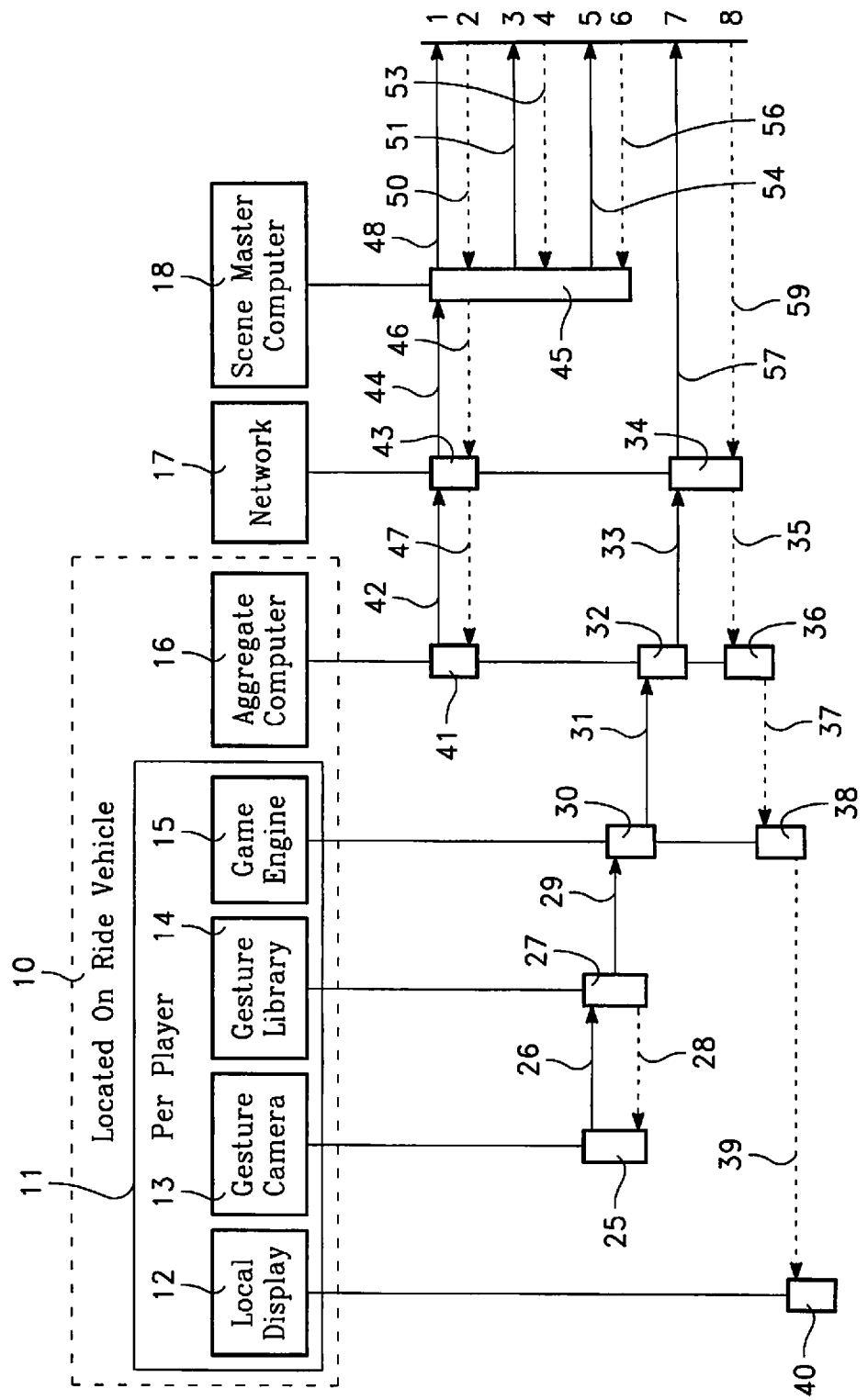
Figure 1B:
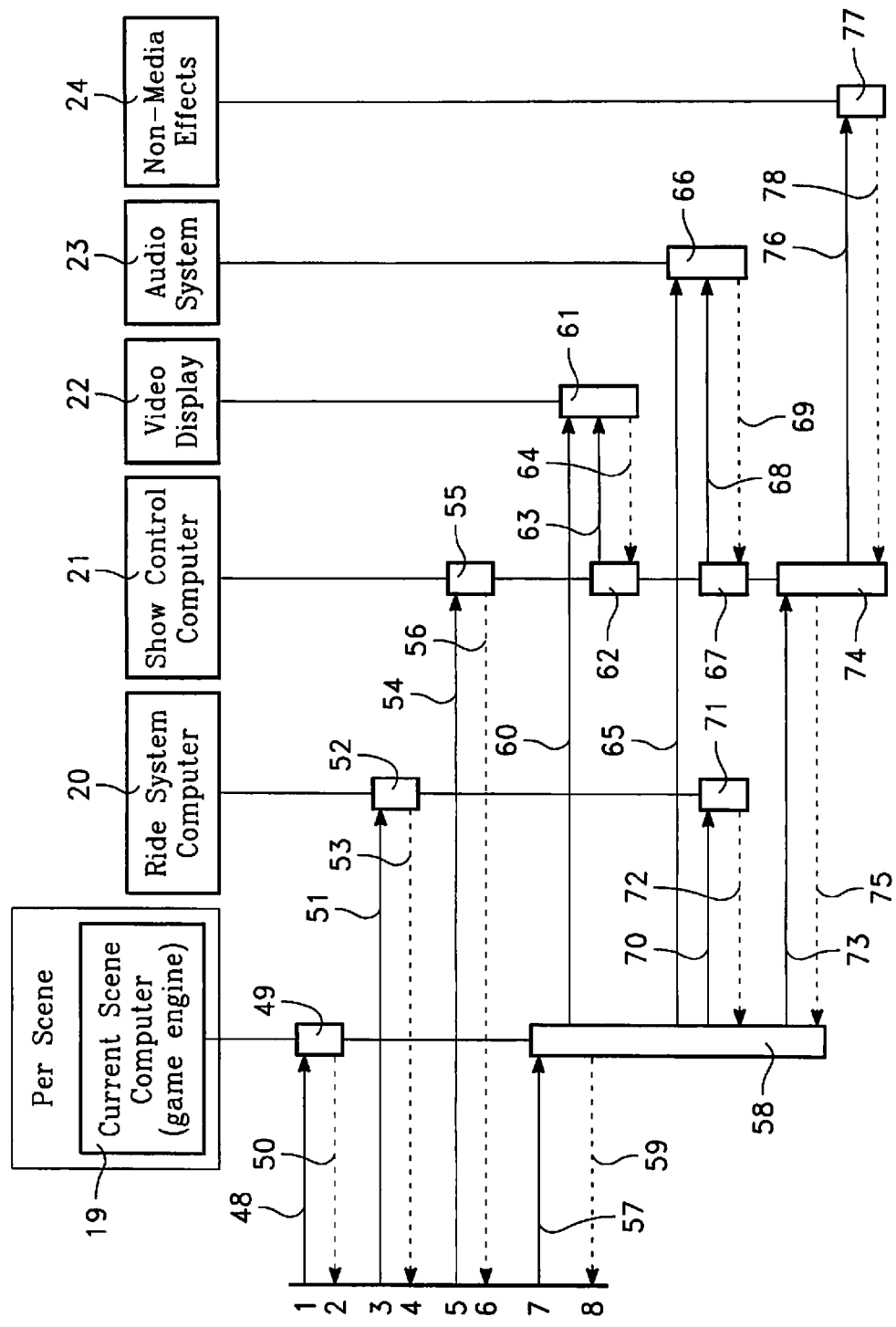

The drawing shows a ride vehicle 10 that includes, for each vehicle rider/player, a local display screen 12, a gesture camera 13 to capture a player's gestures, a gesture library 14 of common player gestures for matching to a new player gesture perceived by camera 13, and a local game engine 14 that passes gesture definitions and position data to an aggregate computer 16 that assembles/bundles all players' gesture data to affect the current game scene 58.

When a ride vehicle enters a scene, the scene master computer 18 and vehicle aggregate computer 16 coordinate 41-50 so that the correct current scene computer 19 knows which vehicle's 10 gesture data 57 to respond to. The scene master computer 18 may need to communicate 51-53, 54-56 with the ride system computer 20 and the show control computer 21 as the vehicle 10 enters the scene to activate the physical space as necessary for the experience. The scene master computer 18 will also monitor the ride system status 53 and show control status 56 for control coordination and error checking.

Video signals from the gesture camera 13 are ingested and analyzed 26 by the gesture library 27. Gesture definitions and position data 29 are passed via the game engine 30 to the aggregate computer 32 where they are bundled with the other riders' data. The game data is passed to the correct current game scene 58 over the network 34. Game data pertinent to the player is returned from the current game scene 58 over the network 34 to the aggregate computer 36 to each rider's game engine 38 for local display 40 to the rider.

The game 58 running on the current scene computer 19 is affected by the bundled gesture data 57 from all riders on the vehicle 10. The game "world" is represented using video displays 22, audio systems 23, and other, non-media, show action equipment 24 (lighting, animatronics, etc) as dictated by the experience's story. Maintenance, operations, and game-specific interactions 61-64, 66-69, 76-78 for the video 22, audio 23 and non-media 24 systems originate with the show control computer 21.

All actions may be occurring between several vehicles within several scenes concurrently.

What is claimed is:

1. A combination of amusement park attraction ride vehicles
    with gesture-based game controllers to form an interactive amusement ride including a ride vehicle mounted interactive system including ride-mounted game displays, cameras and gesture recognition software for each of a plurality of riders that capture rider gestures, and convert said gestures into signals that are inputs to, and affect, said ride-mounted game, wherein each of the ride vehicles has a gesture control camera installed within the vehicles for each rider; further comprising, for each vehicle, an on-board computer to aggregate a plurality of rider gestures for input to said interactive ride's off-board computers.

2. The system of claim 1 further comprising an off-board master computer to connect vehicle gesture data with multiple off-board scene computers, in order to allow interactivity between riders and the surrounding attraction.

3. A combination of amusement park attraction ride vehicles
    with gesture-based game controllers to form an interactive amusement ride comprising, for each rider, a game display device, a camera to capture rider gestures, a gesture library to analyze and identify a rider's gestures, and a computer to aggregate a plurality of rider gestures for input to said game and for display of changes to the game resulting from the input, wherein each of the ride vehicles has a gesture control camera installed within the vehicles for each rider; further comprising, for each vehicle, an on-board computer to aggregate a plurality of rider gestures for input to said interactive ride's off-board computers.

4. The system of claim 3 further comprising an off-board master computer to connect vehicle gesture data with multiple off-board scene computers, in order to allow interactivity between riders and the surrounding attraction.

* * * * *